US00RE34125E

United States Patent [19]

Amos et al.

[11] E Patent Number: Re. 34,125

[45] Reissued Date of Patent: Nov. 10, 1992

[54] ROLLER HOLD DOWN DEVICE

[75] Inventors: James R. Amos; Chester K. Greathouse; David S. Riddle, all of McMinnville, Tenn.

[73] Assignee: Stanwich Industries, Inc.

[21] Appl. No.: 56,784

[22] Filed: Jun. 2, 1987

Related U.S. Patent Documents

Reissue of:

[64] Patent No.: 4,610,582
Issued: Sep. 9, 1986
Appl. No.: 741,352
Filed: Jun. 5, 1985

[51] Int. Cl.[5] ..... B23B 47/00; B23C 3/13; B23Q 15/00

[52] U.S. Cl. ..... 409/80; 51/165.71; 51/231; 83/451; 144/249 A; 408/3; 408/4; 408/98; 409/141; 409/189; 409/197

[58] Field of Search ..... 409/141, 163, 189, 197, 409/202, 203, 225, 226, 80; 408/4, 62, 66, 70, 98, 107, 143, 3; 144/249 R, 249 A; 51/231, 165 TP, 165.71, 165.91; 83/374, 451, 461, 925 CC

[56] References Cited

U.S. PATENT DOCUMENTS 83,684 11/1868 Baily .
1,356,726 10/1920 Lundquist .
1,714,213 5/1929 Claybourn ..... 409/183 X
2,679,871 6/1954 Ford ..... 144/249 R
3,277,935 10/1966 Rebick .
3,738,403 6/1973 Schwoch et al. .
4,212,570 7/1980 Larsson ..... 409/225 X
4,213,315 12/1978 Keller et al. .
4,251,174 2/1981 Satler ..... 409/141 X
4,304,512 12/1981 Vierstraete ..... 83/925 CC X
4,382,728 5/1983 Anderson et al. ..... 409/202 X
4,531,438 7/1985 Pair ..... 144/249 R

FOREIGN PATENT DOCUMENTS 576428 8/1956 Italy .

*Primary Examiner*—Z. R. Bilinsky

[57] ABSTRACT

A roller hold down device for removable work table which has a pair of rollers which extend transversely across the workpiece mounted on the movable table so as to hold it down and with a pair of cam roller members mounted on either side of the movable table and formed with cam portions so as to engage the rollers at the end of travel so as to force the rollers up away from the workpiece and also so as to prevent the rollers from falling off of the end of the workpiece. The rollers are controlled by hydraulic cylinders which can be actuated to automatically move them to the down position and also to move them to the up position.

12 Claims, 2 Drawing Sheets

ROLLER HOLD DOWN DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to movable work tables for a workpiece and in particular to a novel roller hold down apparatus.

2. Description of the Prior Art

Various clamps and other arrangements are known for holding workpieces to a work table.

SUMMARY OF THE INVENTION

It is an object of the present invention to provide a novel roller hold down device for holding a workpiece to a moving table wherein the rollers are rotatably supported at opposite ends by bearings which are connected to piston rods mounted in hydraulic cylinders which when actuated bias the rollers down against the workpiece to hold it on the moving table and wherein a pair of cam guide members are attached to the movable work table and are provided with cam portions such that adjacent the ends of movement of the movable table such cam portions engage the rollers to move them up away from the workpiece so as to prevent the rollers from falling off the end of the work table as the end of the work table passes under the roller.

It is an object of the present invention to provide automatic roller hold down mechanism which holds a workpiece to a moving table but which releases the workpiece as the end of the table is approached by the roller.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figures 1, 2:
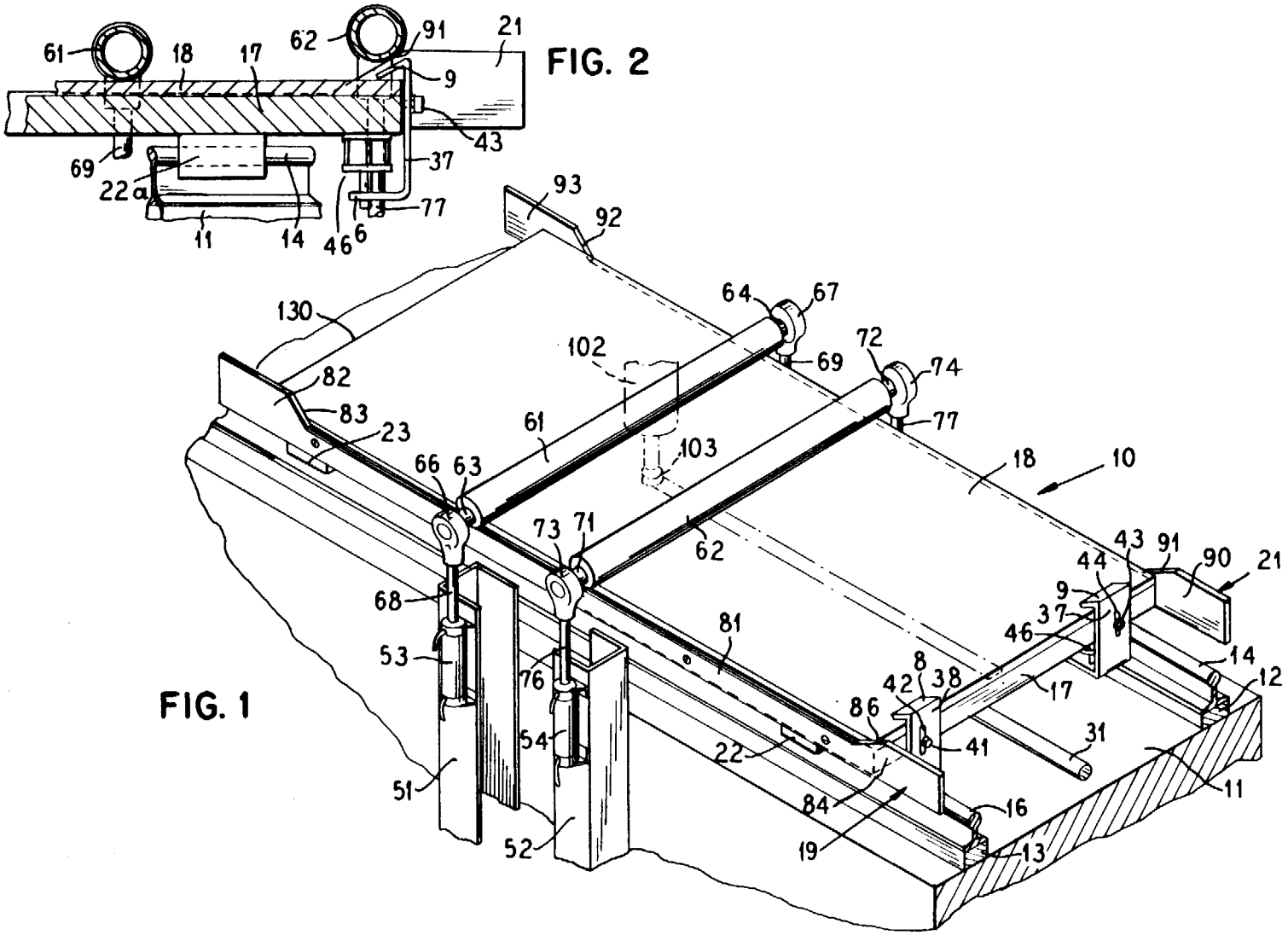
FIG. 1 is a perspective view of the novel roller hold down mechanism of the invention.
FIG. 2 is a partially cutaway sectional view illustrating the roller hold down mechanism of the invention.
Figure 3:
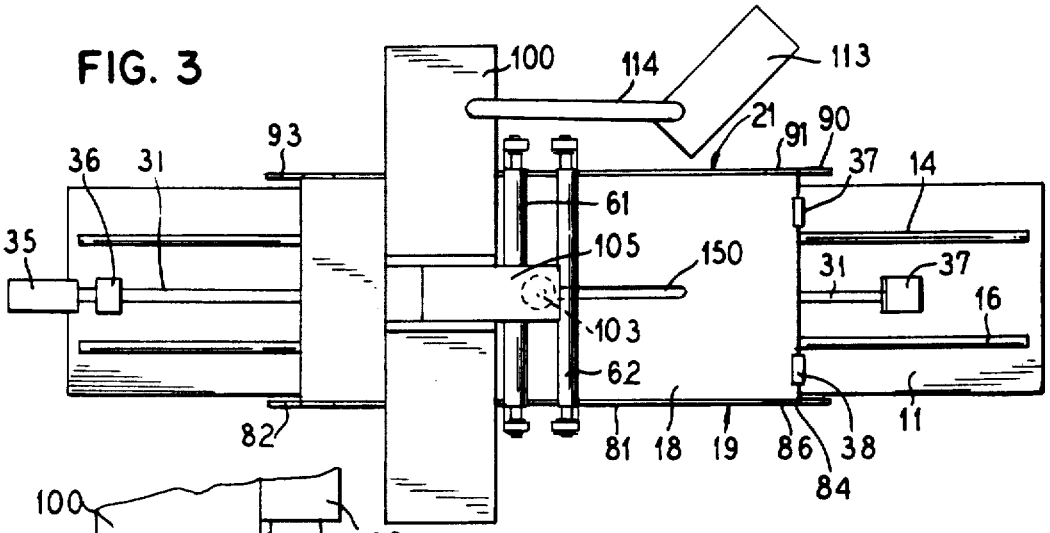
FIG. 3 is a top plan view illustrating the invention.

FIG. 1 illustrates the novel roller hold down mechanism of the invention 10. A base member 11 is formed with a pair of longitudinal supports 12 and 13 upon which guide rails 14 and 16 are mounted. A movable work table 17 is formed with rail engaging roller brackets 22 and 23 which engage rail 16 and corresponding roller brackets 22a and 23a which engage the rail 14. The roller brackets 22 and 23 allow the work table 17 to move longitudinally on the rails 14 and 16 and such movement is facilitated with a motor 35 mounted on the frame 11 as illustrated in FIG. 3 and drives a shaft 31 mounted in bearings 36 and 37 at opposite ends of the frame 11. The shaft 31 is threaded between the bearings 36 and 37 and engages a threaded member attached to the lower surface of the work table 17 so as to drive the work table 17 back and forth on the frame 11.

A workpiece 18 may be mounted on the upper surface of the movable table 17 by means including end clamps 37 and 38 which are formed with workpiece engaging lips 8 and 9, respectively which engage the upper surface of the workpiece 18. The clamps 37 and 38 are formed with slots 44 and 42 which extend in the vertical direction and bolts 43 and 41 extend through the slots and are attached to the work table 17. As is best illustrated in FIG. 2, the clamp 37 has a lower portion 6 which extends beneath the work table 17 and a cylinder 46 has a piston rod which is connected to the portion 6 so as to move the clamp 37 up and down so that the lip 9 engages the workpiece 18 and hold it to lock its end to the moving table 17.

A pair of hold down rollers 61 and 62 are provided for also holding the workpiece 18 down to the work table 17 and the roller 61 has end portions 63 and 64 at either end which extend into bearings 66 and 67 that are respectively mounted on piston rods 68 and 69 which are received in cylinders 53 and 50. The roller 62 has end portions 71 and 72 which extend into bearings 73 and 74 which are mounted on piston rods 76 and 77 which extend into cylinders 54 and 60.

The cylinders 53 and 54, 50 and 60 are rigidly attached to the base 11 and, for example, the attachment of the cylinders 53 and 54 is illustrated in FIG. 1 where they are mounted to U-beams 51 and 52 which are attached to the base 11. It is to be realized that the cylinders 50 and 60 are also rigidly attached to the base 11.

Side cam members 19 and 21 are attached to table 17 and are provided with relatively thick ends 82 and 93 which join a slanted cam portion 83 and 92, respectively, and the opposite end is formed with higher portions 84 and 90 which connect to the lower center portion 81 with a slanted surface 86 and 91 as shown. The cam members 19 and 21 respectively engage the portions 63 and 71 of the rollers 61 and 62 and the portion 64 and 72 such that if in the condition when the rollers 61 and 62 are held down on the workpiece 18 due to the fact that the cylinders 53 and 50 and 54 and 60 are actuated the cam portions 83 and 92 will force the roller 61 up away from the workpiece 18 when the roller 61 approaches the end 130 of the workpiece 18. This prevents the roller 61 from falling off of the end of the workpiece 18 and the table 17 thus blocking the movement of the work table in the opposite direction which could also damage the roller 61. It is to be realized that the higher portions 82 and 93, 84 and 90 are of a sufficient length that the rollers 61 and 62 will not run off the ends of these members.

Figure 4:
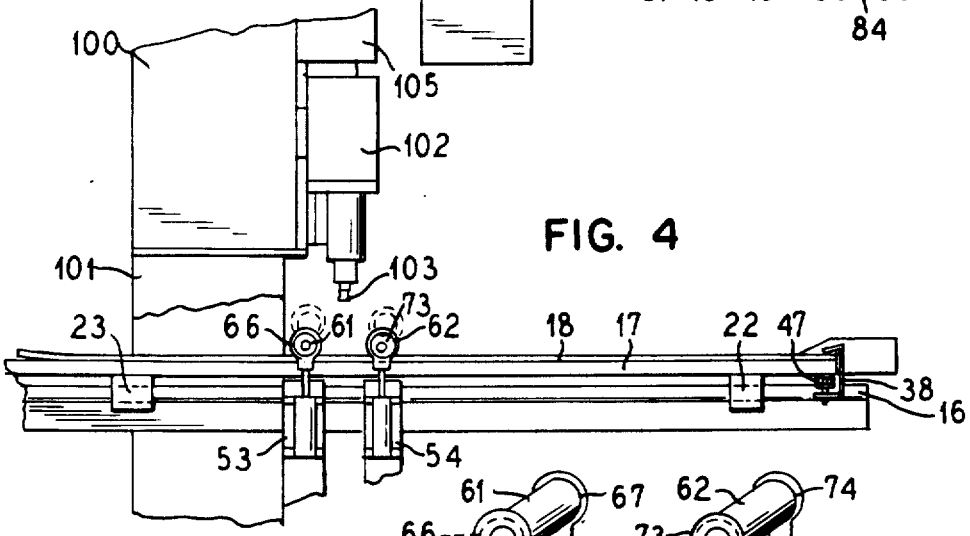
FIG. 4 is a side plan view of the invention.

The movable table 17 may be associated with a routing machine such as a Powermatic Computer numerically control router such as illustrated in FIGS. 3 and 4. The router tool 103 is mounted on a movable holder 102 and the router tool is driven by a motor 105 which is mounted on a support 100 which is in turn mounted on a vertical support member 101 which may be fixed relative to the base member 11. Thus, the router 103 can be moved in the transverse direction relative to the workpiece 18 so that the router 103 may cut a groove 150 as illustrated in any desired pattern as the work table and workpiece are moved to the left and right relative to FIGS. 3 and 4.

Figure 5:
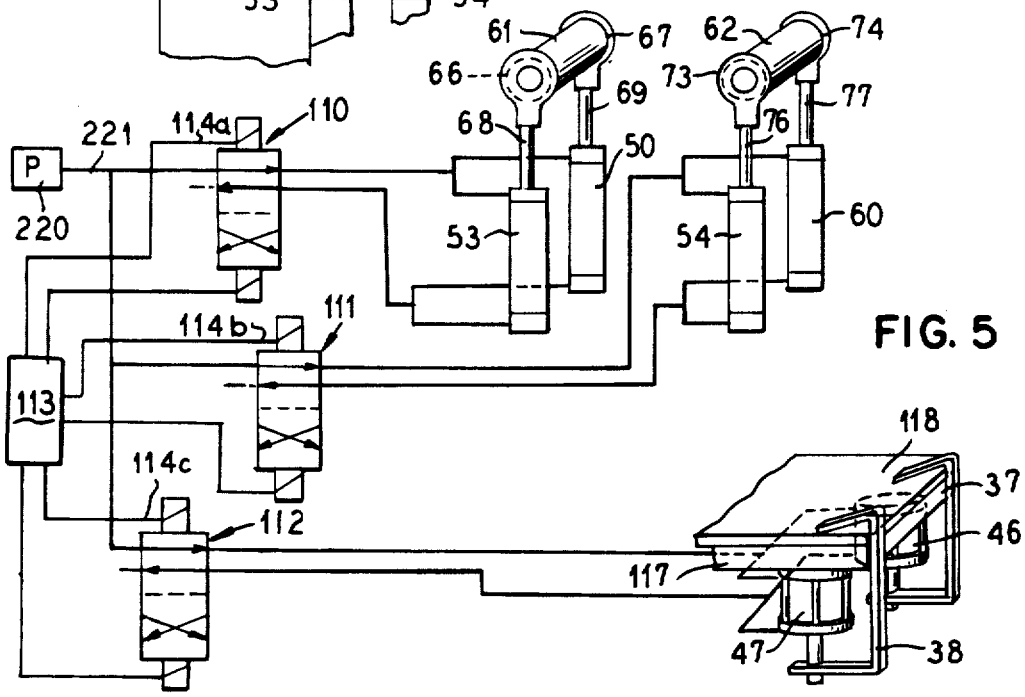
FIG. 5 illustrates the control system for the rollers of the invention.

FIG. 5 illustrates a control system for the novel hold down system of the invention wherein a control 113 has a multiple cable 114 with a first cable 114a connected to a solenoid valve 110 which is connected to control the positions of the piston rod 68 and 69 by energizing the cylinders 53 and 50 with a suitable hydraulic supply from a pump 220 which is connected to valve 110 by a suitable supply line 221. A lead 114b is connected to a solenoid valve 111 which is connected to control the cylinders 54 and 60 so as to move the piston rods 76 and 77 associated with the roller 62. A solenoid valve 112 is connected by electrical lead 114c to the control 113 and controls the position of the piston rods associated with the hydraulic cylinders 46 and 47 which actuate the hold down clamps 37 and 38.

In operation, the solenoid valves 110, 111 and 112 are moved to the positions to raise the roller 61, 62 to the up position as illustrated in dash line in FIG. 4. The clamps 37 and 38 also move to the up position so that a workpiece 18 can be mounted on the work table 17. After the workpiece is mounted on the work table the solenoid valves 110, 111 and 112 are energized so as to move the clamps 37 and 38 to the down position to lock the end of the workpiece 118 to the table 117 and to move the rollers 61 and 62 to the down position so that they engage the upper surface of the workpiece 18 at spaced positions as illustrated in FIGS. 1, 2, 3 and 4. Then the motor 35 is energized to move the workpiece 18 and the work table 17 relative to the router 103 and the router 103 cuts a suitable groove 150 in the workpiece. If the table 17 and workpiece 18 move until the cam portions 83 and 92 engage the portions 63 and 64 of the roller the cam portions will move the roller 61 up away from the surface of the workpiece 18 and the portions 82 and 93 will hold the roller out of engagement with the workpiece 18. In a similar manner, if the work table 17 and workpiece 18 is moved to the right relative to FIGS. 1, 3 and 4 such that the cam portions 86 and 91 engage the portions 71 and 72 of the roller 62 the roller 62 will be cammed upwardly so that it rolls on the portions 84 and 90 thus disengaging the workpiece 118 and preventing the rollers 62 from falling off the end of the table 17.

Thus the present invention provides a positive mechanical release of the rollers 61 and 62 as they reach the ends of the workpiece. Also, the computer for the router may be connected to control the rollers 61, 62 and the clamps 37 and 38 to automatically release them.

The novel roller hold down system of the invention comprises a clamping technique used to securely hold sheet materials for driling, boring, sawing, routing and shaping on a movable table of a machine tool. Warped, cracked, rough and porous materials cannot be practically held with a vacuum system. Also, good quality materials may be cut into small parts or part configurations which are not suitable to be held with a vacuum. The roller hold down apparatus of the invention holds sheet material flat against the moving table while moving under the cutter head as the cutter head machines the workpiece as it passes between the rollers. The clamps 37 and 38 secure the workpiece 18 flush against the end of the table 17 and these clamps have to inhibit motion of the workpiece in the vicinity of the cutting zone.

As the rollers approach the end of the table travel the outside roller is raised either mechanically by the roller cams or electronically by the computer controlling the router. This action prevents the roller from falling off the table and then being damaged as the table moves back against the outside roller.

Although the invention has been described with respect to preferred embodiments, it is not to be so limited as changes and modifications can be made which are within the full intended scope of the invention as defined by the appended claims.

We claim as our invention:

1. A roller hold down device for a longitudinally movable work table mounted on a base to hold a workpiece thereto comprising, a first roller which extends transversely of said movable work table, a first pair of roller support means mounted to said opposite sides of said base and rotatably supporting said roller so as to flexibly bias said roller against said workpiece, and a first cam means attached to said movable table and engageable with said roller adjacent one end of said work table to lift it out of engagement with said workpiece.

2. A roller hold down device according to claim 1 including a second cam means attached to said movable table and engageable with said roller at a lateral offset position from said first cam means adjacent said one end of said work table to lift it out of engagement with said workpiece.

3. A roller hold down device according to claim 1 including a third cam means engageable with said roller adjacent the second end of said work table to lift it out of engagement with said workpiece.

4. A roller hold down device according to claim 3 including a fourth cam means engageable with said roller adjacent said second end of said work table and laterally offset from said third cam means so as to lift said roller out of engagement with said workpiece.

5. A roller hold down device according to claim 4 wherein said pair of roller support means comprise a first pair of hydraulic cylinders with movable piston rods and said first roller rotatably supported by said piston rods, said first cylinders attached to said base, and hydraulic control means connected to said first pair of cylinders to energize them.

6. A roller hold down device according to claim 2 including a second roller which extends transversely to said movable workpiece at a position longitudinally offset from said first roller, and a second pair of roller support means mounted to opposite sides of said base and rotatably supporting said second roller so as to flexibly bias it against said workpiece.

7. A roller hold down device according to claim 6 wherein said second cam means is engageable with said second roller to move it out of engagement with said workpiece.

8. A roller hold down device according to claim 7 wherein said second pair of roller support means comprise a second pair of hydraulic cylinders with movable piston rods and said second roller rotatably supported by said piston rods, and said second cylinders attached to said base and said hydraulic control means connected to said second pair of cylinders to energize them.

9. A roller hold down device according to claim 8 including end workpiece clamping means to clamp the end of said workpiece to said work table.

*10. A roller hold down device for a longitudinally movable work table mounted on a base having opposite sides to hold a workpiece thereto comprising, a first roller which extends transversely of said movable work table, a first pair of roller support means mounted to said opposite sides of*

*said base and rotatably supporting said roller so as to flexibly bias said roller against said workpiece, and a computer connected to control said roller to automatically release it from engagement with said workpiece as said roller approaches the end of table travel.*

*11. A roller hold down device according to claim 10 including end workpiece clamping means to clamp the end of said workpiece to said work table and said computer connected to said clamping means to automatically release them.*

*12. On a longitudinal work table mounted on a base having opposite ends, a roller hold down device for a longitudinal work piece which is movable in a transverse direction relative to a movable router tool comprising, a first roller which extends transversely of said work table and said work piece, a first pair of roller support means mounted to said opposite ends of said base and rotatably supporting said roller so as to flexibly bias said roller against said work piece, and a computer connected to control said roller to automatically release it from engagement with said work piece as said roller approaches the end of the table travel.*

* * * * *